US009157562B2

United States Patent
Carlson et al.

(10) Patent No.: US 9,157,562 B2
(45) Date of Patent: Oct. 13, 2015

(54) POSITIVE SWIVEL FITTING

(75) Inventors: Brent J. Carlson, Watertown, WI (US); Brian M. Hathaway, Watertown, WI (US)

(73) Assignee: Baso Gas Products LLC, Watertown, WI (US)

( * ) Notice: Subject to any disclaimer, the term of this patent is extended or adjusted under 35 U.S.C. 154(b) by 389 days.

(21) Appl. No.: 13/233,211

(22) Filed: Sep. 15, 2011

(65) Prior Publication Data

US 2012/0080111 A1 Apr. 5, 2012

Related U.S. Application Data

(60) Provisional application No. 61/389,878, filed on Oct. 5, 2010.

(51) Int. Cl.
*F16L 41/00* (2006.01)

(52) U.S. Cl.
CPC .......... *F16L 41/005* (2013.01); *Y10T 137/9029* (2015.04)

(58) Field of Classification Search
USPC ........ 285/190, 98, 219–221, 272, 272.1, 273, 285/275, 278, 280–281
See application file for complete search history.

(56) References Cited

U.S. PATENT DOCUMENTS

| | | | |
|---|---|---|---|
| 1,564,934 A | 12/1925 | Buelna et al. | |
| 1,657,987 A | 1/1928 | Alertoni | |
| 2,489,441 A * | 11/1949 | Doyle | 285/98 |
| 3,007,485 A * | 11/1961 | Barker | 137/454.2 |
| 3,112,127 A * | 11/1963 | Campbell | 285/143.1 |
| 3,145,035 A * | 8/1964 | Hanback | 285/110 |
| 3,743,183 A | 7/1973 | Malcolm | |
| 3,764,073 A | 10/1973 | Costa et al. | |
| 3,957,205 A | 5/1976 | Costa | |
| 4,062,494 A | 12/1977 | Healy | |
| 4,239,262 A | 12/1980 | Krupp et al. | |
| 4,437,690 A | 3/1984 | Drath | |
| 4,452,695 A * | 6/1984 | Schmidt | 210/167.05 |
| 4,784,412 A | 11/1988 | Van Dongen | |
| 5,052,432 A | 10/1991 | Vonalt et al. | |
| 5,110,161 A | 5/1992 | Bartholomew | |
| 5,803,360 A * | 9/1998 | Spitznagel | 239/345 |
| 7,267,374 B2 | 9/2007 | Nielson | |

* cited by examiner

*Primary Examiner* — Aaron Dunwoody
*Assistant Examiner* — Fannie Kee
(74) *Attorney, Agent, or Firm* — Joseph S. Heino; Patrick M. Bergin

(57) ABSTRACT

A positive swivel fitting provides for a system flow transmitting portion and a separate lock-down portion. The flow transmitting portion is configured to be receivable within the lock-down portion. When the flow transmitting portion is properly and "positively" positioned, then the lock-down portion can be secured and the position of the flow transmitting portion is maintained, thus making alignment with other parts of the flow device variable. The fitting can be used within any air, other gas or liquid flow system.

4 Claims, 5 Drawing Sheets

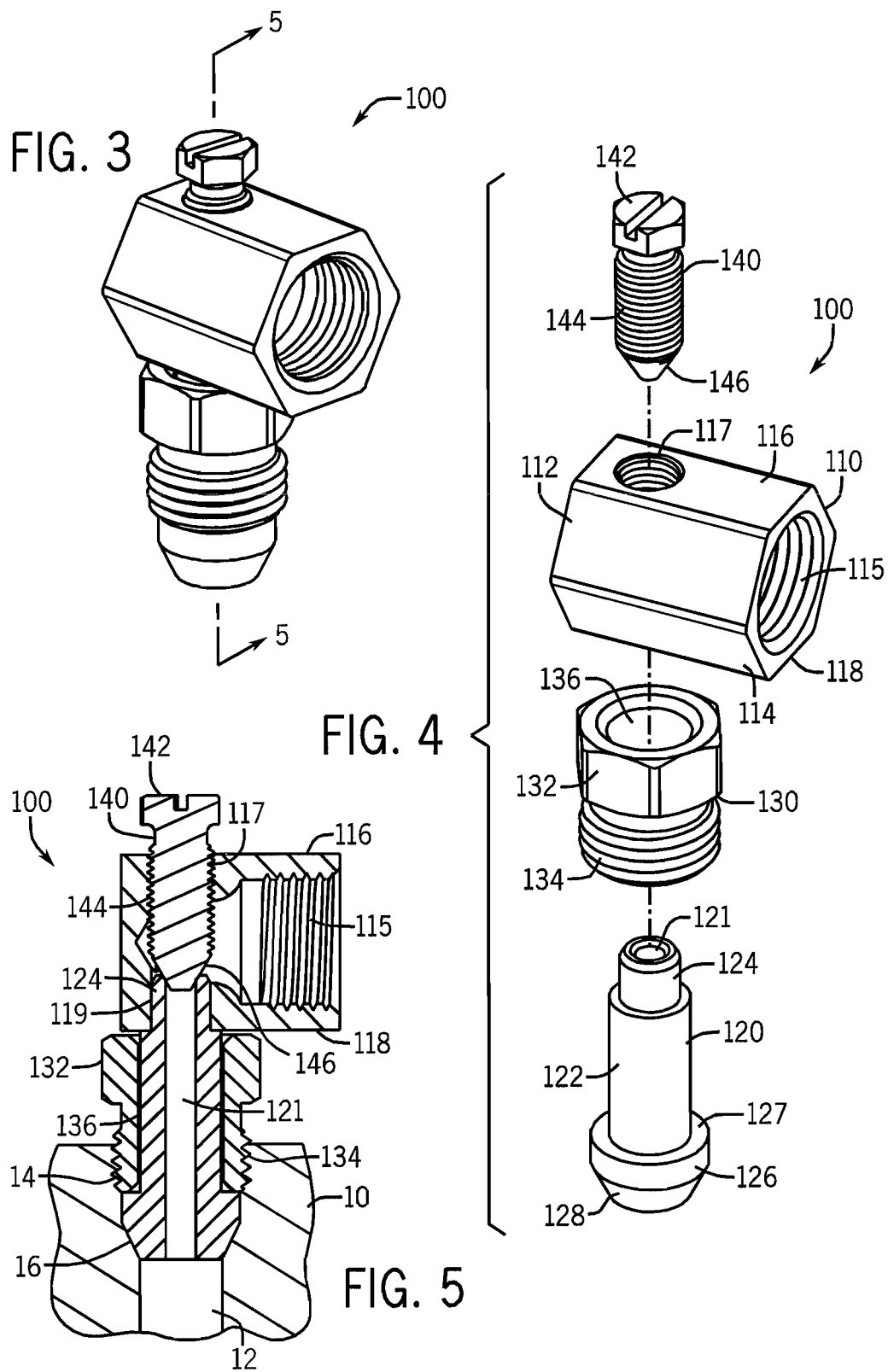

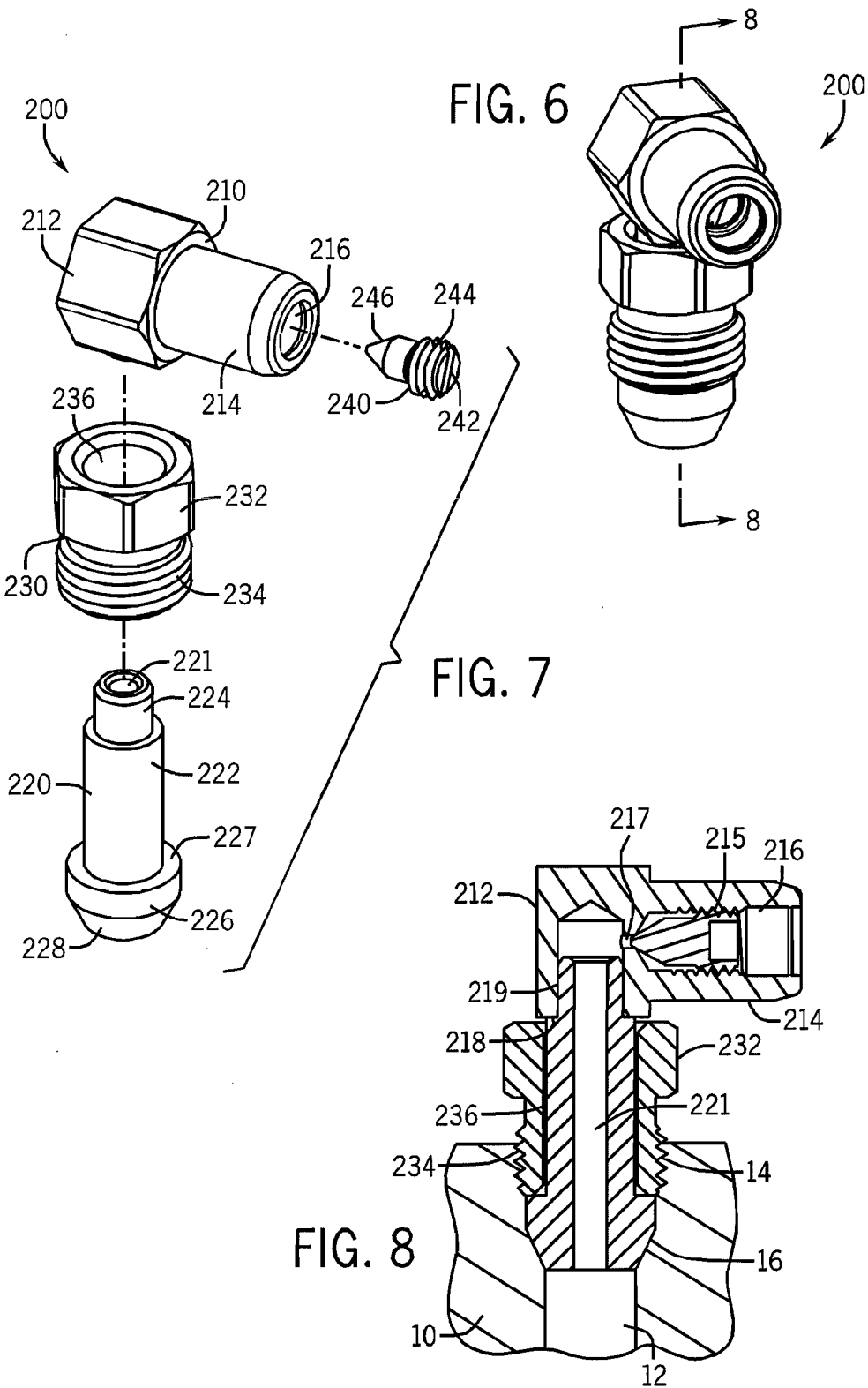

POSITIVE SWIVEL FITTING

This application claims the benefit and priority of U.S. Provisional Patent Application No. 61/389,878 filed Oct. 5, 2010.

FIELD OF THE INVENTION

This invention relates generally to connectors and couplers of the type that are used with any type of system that allows or requires air, gas or liquid flow throughout the system and between its components. More specifically, the present invention relates to a positive swivel fitting that can be rotated and positively positioned anywhere within a 360° range of motion prior to securing the fitting in a tightened-down position for ease in accessing the fitting following securement.

BACKGROUND OF THE INVENTION

Connectors and couplers are well known in systems that allow or require "flow" between system components. Such systems can include, but are not limited to, systems that allow the flow of air, other gases and liquids through them. The positive swivel fitting of the present invention can be used in all such systems.

Further, where an inlet line or a pressure test nipple is provided within the flow system, it is frequently desirable to "point" the fitting in a given direction. By way of example, but without limiting the scope of the present invention, most flow components used in such systems require access to at least one flow inlet line and an inlet line coupler. The coupler is typically a threaded hollow conduit that is secured to some part of the component by means of a like-threaded aperture. Upon installation, the coupler may be aligned such that access to the coupler is made easy. On the other hand, proper alignment which would make access easy may not be possible due to the variability of threading between the parts. Because the coupler is capable of being pointed, or positioned, in virtually any direction within a 360° perimeter, it may not be pointed in a desirable or workable direction following installation. In other words, the coupler discussed here is incapable of "positive" positioning.

In the view of these inventors, the alignment problem mentioned above can be avoided. More specifically, and also in the experience of these inventors, such problems can be avoided where the rotational aspects of the system device are separated from the attachment aspects, and such is a principal object of the present invention.

SUMMARY OF THE INVENTION

The positive swivel fitting of the present invention provides for a system flow transmitting portion and a separate lock-down portion. The flow transmitting portion is configured to be receivable within the lock-down portion. When the flow transmitting portion is properly and "positively" positioned, then the lock-down portion can be secured and the position of the flow transmitting portion is maintained, thus making alignment with other parts of the flow device variable. It is also to be understood that the precise application of this device is not a limitation of the present invention since the device of the present invention can be used within virtually any air, other gas or liquid flow system.

The foregoing and other features of the positive swivel fitting of the present invention will be apparent from the detailed description that follows.

BRIEF DESCRIPTION OF THE DRAWINGS

FIG. 3 is an enlarged front, top and left side perspective view of the positive swivel fitting shown in FIG. 1.

FIG. 4 is an exploded view of the positive swivel fitting shown in FIG. 3.

FIG. 5 is a cross-sectioned left side elevational view of the positive swivel fitting shown in FIG. 3, taken along line 5-5 of FIG. 3.

FIG. 6 is a front, top and left side perspective view of a second embodiment of the positive swivel fitting constructed in accordance with the present invention.

FIG. 7 is an exploded view of the positive swivel fitting shown in FIG. 6.

FIG. 8 is a cross-sectioned left side elevational view of that embodiment of the positive swivel fitting shown in FIG. 6, taken along line 8-8 of FIG. 6.

DETAILED DESCRIPTION

Figure 1:
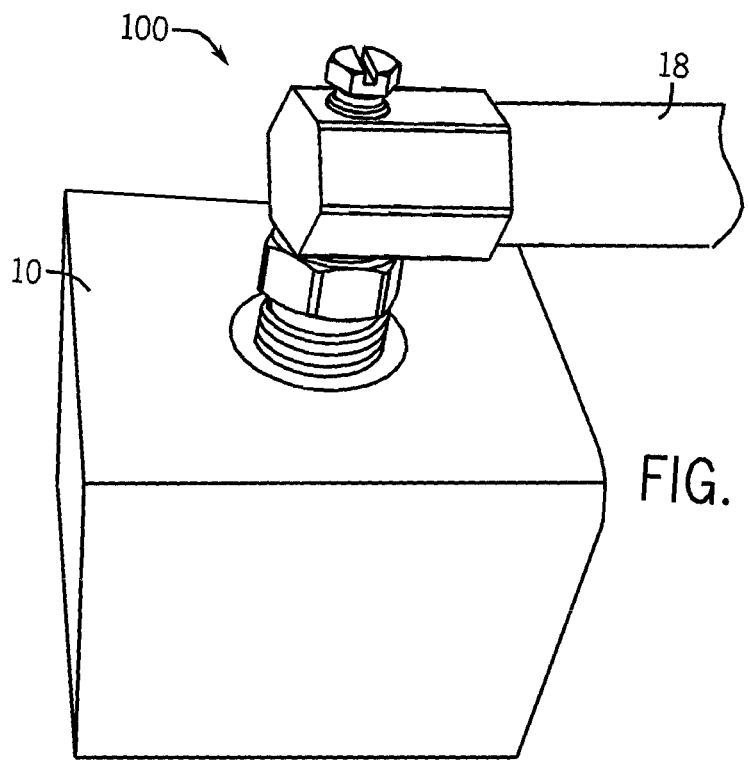
FIG. 1 is a back, top and left side perspective view of a positive swivel fitting constructed in accordance with the present invention and showing the fitting attached to a generic flow system component.
Figure 2:
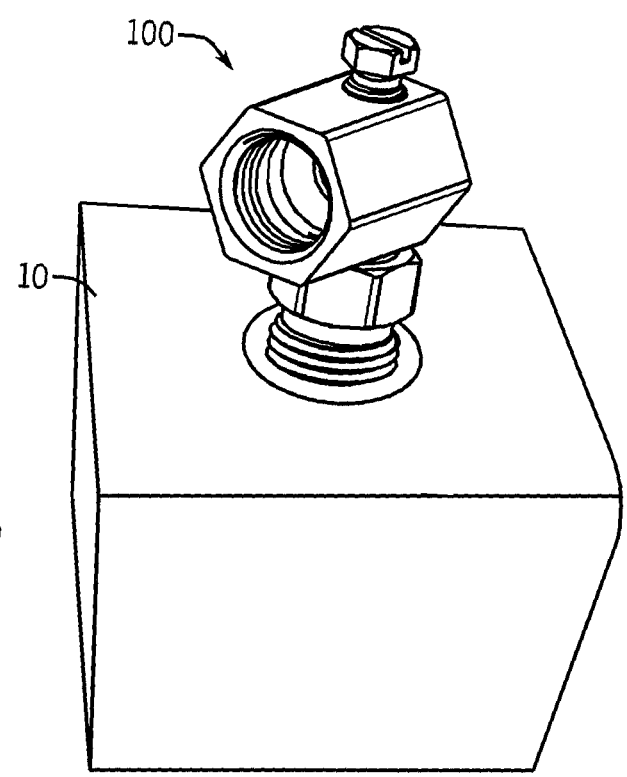
FIG. 2 is a view similar to that shown in FIG. 1 and illustrating the rotatability of the positive swivel fitting about the generic system component.

Referring now to the drawings in detail wherein like numbers represent like elements throughout, FIGS. 1 and 2 illustrate a perspective view of a positive swivel fitting, generally identified 100, as it would be constructed in accordance with the present invention. As shown, the positive swivel fitting 100 can be variably positioned within the generic flow system component 10. That is, prior to securing the positive swivel fitting 100 to the generic flow system component 10, which also positively "fixes" its position of the positive swivel fitting 100 relative to the generic flow system component 10, the positive swivel fitting 100 is freely rotatable relative to the generic flow system component 10. In this fashion, it will be appreciated that the positive swivel fitting 100 can be rotated 360° relative to the generic flow system component 10 prior to being tightened down or secured to a threaded aperture in the generic flow system component 10. The details and advantages of this construction will be apparent later in this detailed description. Again, it is to be noted that the type of generic flow system component 10 that the positive swivel fitting 100 is used with is not a limitation of the present invention. The positive swivel fitting 100 is used to connect the generic flow system component 10, in this example, to a flow line 18 and in a specific direction relative to the generic flow system component 10, as shown in FIG. 1.

Referring now to FIGS. 3, 4 and 5, they illustrate the first embodiment of the positive swivel fitting 100 that is constructed in accordance with the present invention. The positive swivel fitting 100 comprises a swivel fitting body 110, a swivel fitting stem 120, a swivel fitting nut 130 and a swivel fitting adjustment screw 140.

The swivel fitting body 110 of the positive swivel fitting 100 comprises a first end 112 and a second end 114. A top surface 116 is provided as is a bottom surface 118. See FIG. 5. As shown, the swivel fitting body 110 is configured with a hexagonal cross-section. Such is not, however, a limitation of the present invention. A first threaded aperture 117 is defined within the top surface 116 of the swivel fitting body 110. Axially aligned with the swivel fitting body 110 is a second threaded aperture 115, which is disposed at the second end 114 of the swivel fitting body 110. The swivel fitting body 110 further comprises a bottom surface 118 having an aperture 119 extending inwardly of the swivel fitting body 110. Again, see FIG. 5.

The swivel fitting 100 further comprises a swivel fitting stem 120 having a cylindrical middle portion 122, a reduced diameter first end 124 and a second end 126, the second end having a shoulder 127 and a tapered portion 128, both circumferentially defined about it. An axially-aligned aperture 121 extends through the center of the stem 120 and creates a flow continuum through the stem 120.

The swivel fitting body 110 of the first embodiment further comprises a swivel fitting nut 130 having a hexagonally-shaped first end 132, a threaded second end 134 and an internal cylindrical aperture 136. The diameter of the internal cylindrical aperture 136 of the swivel fitting nut 130 is slightly greater than the outer diameter of the cylindrical middle portion 122 of the swivel fitting stem 120. In this way, the swivel fitting nut 130 can rotatably fit around the middle portion of the swivel fitting stem 120 and rest upon the shoulder 127 of the swivel fitting nut 130. Again, see FIG. 5.

Finally, the swivel fitting 100 comprises an adjustment screw 140 having a head 142 and a threaded body 144. The threaded body 144 of the adjustment screw 140 is functionally adapted to be received within the first threaded aperture 117 of the swivel fitting body 110. A tapered end 146 to the threaded body 144 is also provided.

In application, the first end 124 of the swivel fitting stem 120 is fixably insertable into the bottom surface aperture 119 of the swivel fitting body 110 with the swivel fitting nut 130 disposed between them. This can be accomplished by press fitting those two structures together. When properly assembled, the central aperture 121 of the swivel fitting stem 120 forms a flow continuum with the second threaded aperture 115 of the swivel fitting body 110. The flow through the swivel fitting body 110 is then controlled by means of the adjustment screw 140, the tapered end 146 thereof fitting into that portion of the aperture 121 at the first end 124 of the stem 120. As shown in FIG. 5, the swivel fitting nut 130 may then be received within the threaded portion 14 of the aperture 12 of the generic flow system component 10 as shown in FIG. 1 or FIG. 2. When loosely attached, the stem 120 and body 110 are capable of rotation throughout 360°. As the nut 130 is tightened down into the aperture 12, the tapered portion 128 of the second end 126 of the stem 120 presses into a tapered portion 16 of the aperture 12 and positively fixes the position of the swivel fitting body 110 as may be desired or required. Rotation of the adjustment screw 140 serves to control pilot flow through the swivel fitting 100 at the first end 124 of the swivel fitting stem 120.

Referring now to FIGS. 6, 7 and 8, they illustrate a second preferred embodiment of the positive swivel fitting 200 that is constructed in accordance with the present invention. The positive swivel fitting 200 comprises a swivel fitting body 210, a swivel fitting stem 220, a swivel fitting nut 230 and a swivel fitting adjustment screw 240.

The swivel fitting body 210 of the positive swivel fitting 200 comprises a first end 212 and a second end 214. See FIG. 7. As shown, first end 212 of the swivel fitting body 210 is configured with a hexagonal cross-section. Such is not, however, a limitation of the present invention. A threaded portion 215 of the aperture 216 at the second end 214 of the swivel fitting body 210 is also axially aligned within the swivel fitting body 210. See FIG. 8. The swivel fitting body 210 further comprises a bottom surface 218 having an aperture 219 extending inwardly of the swivel fitting body 210.

The positive swivel fitting 200 of the second embodiment further comprises a swivel fitting stem 220 having a cylindrical middle portion 222, a reduced diameter first end 224 and a second end 226, the second end having a shoulder 227 and a tapered portion 228, both circumferentially defined about it. An axially-aligned aperture 221 extends through the center of the stem 220 and creates a flow continuum through it.

The swivel fitting body 210 further comprises a swivel fitting nut 230 having a hexagonally-shaped first end 232, a threaded second end 234 and an internal cylindrical aperture 236. The diameter of the internal cylindrical aperture 236 of the swivel fitting nut 230 is slightly greater than the outer diameter of the cylindrical middle portion 222 of the swivel fitting stem 220. The swivel fitting nut 230 can therefore rotatably fit around the middle portion of the swivel fitting stem 220 and rest upon the shoulder 227 of the swivel fitting nut 230. Again, see FIG. 8.

The second embodiment of the positive swivel fitting 200 comprises an adjustment screw 240 having a head 242 and a threaded body 244. The threaded body 244 of the adjustment screw 240 is functionally adapted to be received within the threaded aperture 215 of the swivel fitting body 210. A tapered end 246 to the threaded body 244 is also provided for the purpose of allowing for a pressure tap reading as where a tube (not shown) would overlay the second end 214 of the swivel fitting body 210. In application, the second embodiment of the positive swivel fitting 200 would function substantially the same as that of the first embodiment, the swivel fitting stems 120, 220 and the swivel fitting nuts 130, 230 of each embodiment being substantially identical.

In application, the first end 224 of the swivel fitting stem 220 is insertable into the bottom surface aperture 219 of the swivel fitting body 210 with the swivel fitting nut 230 disposed between them. This can be accomplished by press fitting those two structures together, as mentioned previously. When properly assembled, the central aperture 221 of the swivel fitting stem 220 forms a flow continuum with the second aperture 216, an internal aperture 217 and the bottom surface aperture 219 of the swivel fitting body 210. The swivel fitting nut 230 may then be received within the threaded portion 14 of the aperture 12 of the generic flow system component 10. When loosely attached, the stem 220 and body 210 are capable of rotation throughout 360°. As the nut 230 is tightened down into the aperture 12, the tapered portion 228 of the second end 226 of the stem 220 presses into a tapered portion 16 of the aperture 12 and fixes the position of the swivel fitting body 210 as may be desired or required. Flow through the swivel fitting body 210 is then controlled by means of the adjustment screw 240, the tapered end 246 thereof fitting into the internal aperture 217. See FIG. 8.

Figure 9:
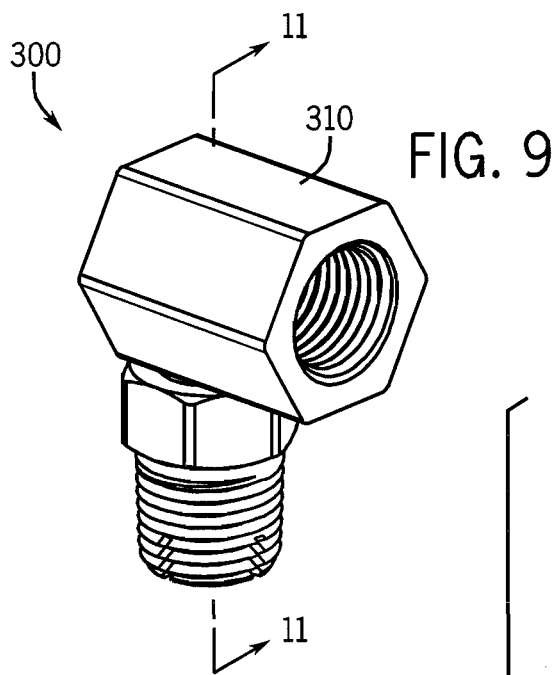
FIG. 9 is a front, top and left side perspective view of a third embodiment of the positive swivel fitting constructed in accordance with the present invention.
Figure 10:
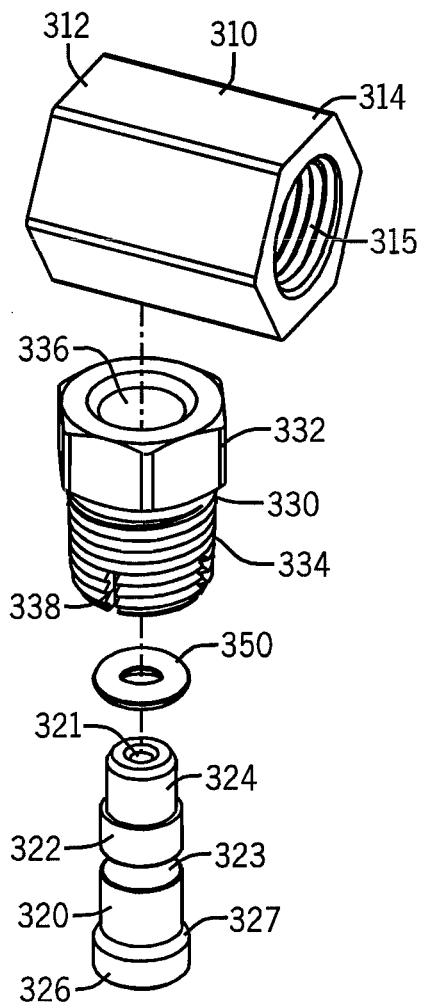
FIG. 10 is an exploded view of the positive swivel fitting shown in FIG. 9.
Figure 11:
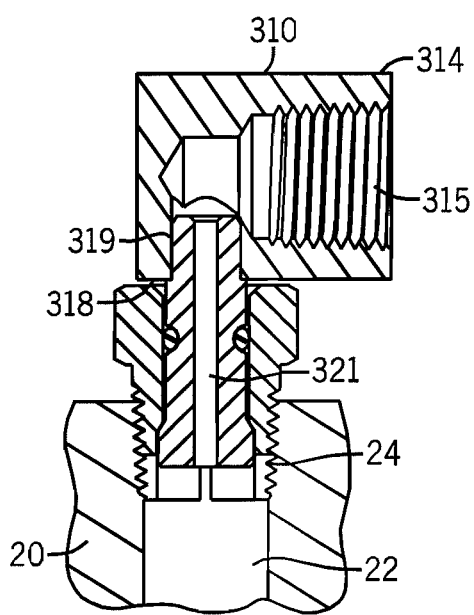
FIG. 11 is a cross-sectioned left side elevational view of that embodiment of the positive swivel fitting shown in FIG. 9, taken along line 11-11 of FIG. 9.

Referring now to FIGS. 9, 10 and 11, they illustrate yet a third preferred embodiment of the positive swivel fitting 300 that is constructed in accordance with the present invention.

This positive swivel fitting 300 comprises a swivel fitting body 310, a swivel fitting stem 320, a swivel fitting nut 330 and a swivel fitting adjustment screw (not shown). It is to be understood that the swivel fitting body 310 of this third embodiment could alternatively utilize a swivel fitting adjustment screw 140, 240 of the prior embodiments if the swivel fitting body 310 was configured as those used in those alternative embodiments. A seal 350 is also included.

The swivel fitting body 310 of the third embodiment of the positive swivel fitting 300 comprises a first end 312 and a second end 314. As shown, the swivel fitting body 310 is configured with a hexagonal cross-section. Again, such is not a limitation of the present invention. Axially aligned with the swivel fitting body 310 is a threaded aperture 315, which is disposed at the second end 314 of the swivel fitting body 310. The swivel fitting body 310 further comprises a bottom surface 318 having an aperture 319 extending inwardly of the swivel fitting body 310. See FIG. 11.

The positive swivel fitting 300 further comprises a swivel fitting stem 320 having a cylindrical middle portion 322, a circumferential middle portion groove 323, a first end 324 and a second end 326. In this embodiment, the second end 326 has a tapered shoulder 327 circumferentially defined about it. An axially-aligned aperture 321 extends through the center of the stem 320 and creates a flow continuum through it.

The swivel fitting body 310 further comprises a swivel fitting nut 330 having a hexagonally-shaped first end 332, a threaded second end 334 and an internal cylindrical aperture 336. The diameter of the internal cylindrical aperture 336 of the swivel fitting nut 330 is slightly greater than the outer diameter of the cylindrical middle portion 322 of the swivel fitting stem 320. In this way, the swivel fitting nut 330 can rotatably fit around the middle portion of the swivel fitting stem 320. Again, see FIG. 11. Note also the seal 350 which is captured within the groove 323 of the stem 320.

Unique to this third embodiment, however, is the fact that the threaded second end 334 of the swivel fitting nut 330 includes a tapered NPT thread with openings 338 defined with in it which allows the second end 334 to be crimped about the second end 326 of the stem 320 when the positive swivel fitting 300 is tightened down into the threaded portion 24 of the aperture 22 in the generic flow system component 20.

Figure 12:
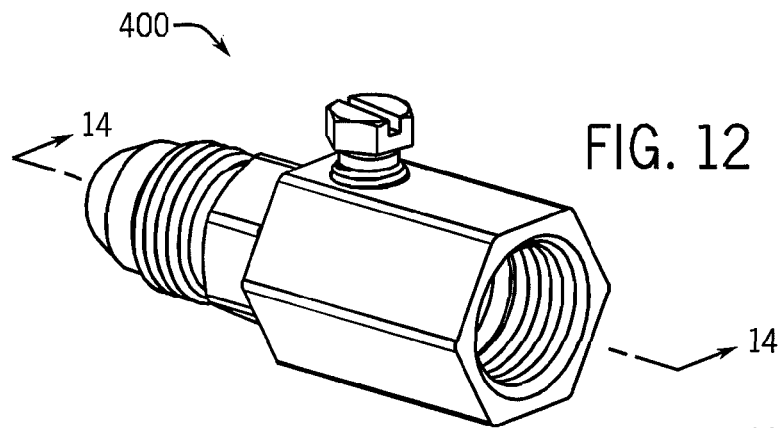
FIG. 12 is a front, top and left side perspective view of a fourth embodiment of the positive swivel fitting constructed in accordance with the present invention.
Figure 13:
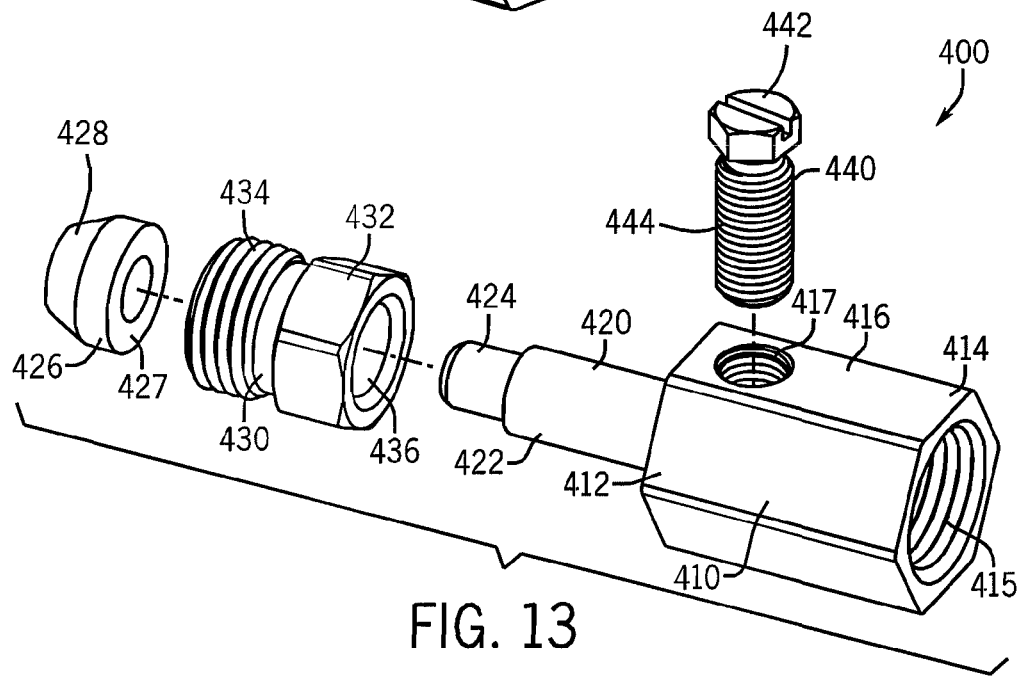
FIG. 13 is an exploded view of the positive swivel fitting shown in FIG. 12.
Figure 14:
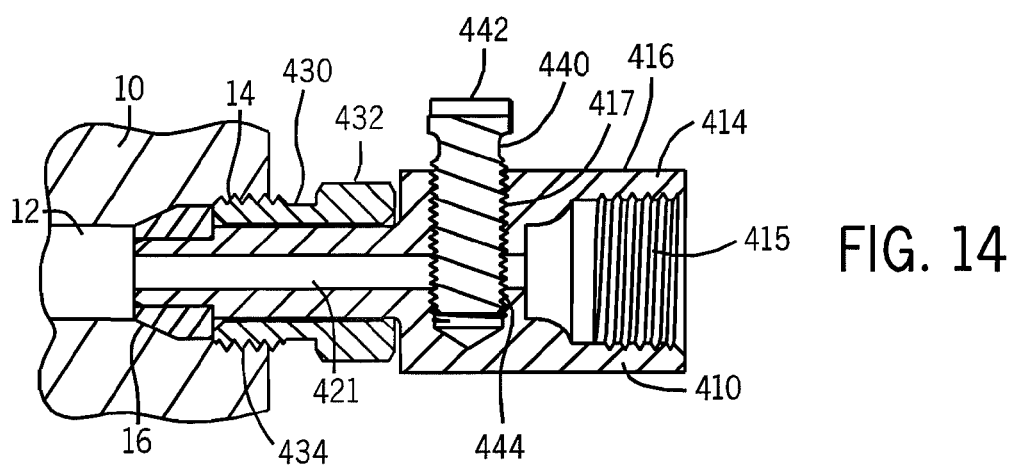
FIG. 14 is a cross-sectioned left side elevational view of that embodiment of the positive swivel fitting shown in FIG. 12, taken along line 14-14 of FIG. 12.

Lastly, and referring now to FIGS. 12, 13 and 14, they illustrate still another alternative embodiment of the positive swivel fitting 400, this embodiment being somewhat similar to the first embodiment of the positive swivel fitting 100 but being configured in more of an in-line design. Specifically, the positive swivel fitting 400 comprises a swivel fitting body 410 that integrates the swivel fitting stem 420 concept into it, a swivel fitting stem tip 426, a swivel fitting nut 430 and a swivel fitting adjustment screw 440.

The swivel fitting body 410 of the swivel fitting 400 comprises a first end 412 and a second end 414. A top surface 416 is provided. As shown, the swivel fitting body 410 is configured with a hexagonal cross-section. Such is not, however, a limitation of the present invention. A first threaded aperture 417 is defined within the top surface 416 of the swivel fitting body 410. Axially aligned with the swivel fitting body 410 is a second threaded aperture 415, which is disposed at the second end 414 of the swivel fitting body 410.

The swivel fitting body 410 further comprises an integrally-formed swivel fitting stem 420 having a cylindrical middle portion 422, a reduced diameter distal end 424 and an axially-aligned aperture 421 that extends through the center of the stem 420 and creates a flow continuum through it.

The swivel fitting body 410 further comprises a swivel fitting nut 430 having a hexagonally-shaped first end 432, a threaded second end 434 and an internal cylindrical aperture 436. The diameter of the internal cylindrical aperture 436 of the swivel fitting nut 430 is slightly greater than the outer diameter of the cylindrical middle portion 422 of the swivel fitting stem 420. In this way, the swivel fitting nut 430 can rotatably fit around the middle portion of the swivel fitting stem 420 and rest upon a shoulder 427 of the swivel fitting stem tip 426, the tip 426 being preferably press-fit onto the reduced diameter distal end 424 of the stem 420.

The positive swivel fitting 400 comprises an adjustment screw 440 having a head 442 and a threaded body 444. The threaded body 444 of the adjustment screw 440 is functionally adapted to be received within the first threaded aperture 417 of the swivel fitting body 410.

In application, this fourth embodiment positive swivel fitting 400 functions substantially similar to the first embodiment positive swivel fitting 100, allowing the rotational position of the swivel fitting body 410 to be selectively positioned prior to final installation. That is, the swivel fitting nut 430 is received within the threaded portion 14 of the aperture 12 of the generic flow system component 10 as shown in FIG. 14. When loosely attached, the stem 420 and body 410 are capable of rotation throughout 360°. As the nut 430 is tightened down into the aperture 14, the tapered portion 428 of the second end 426 of the stem 420 presses into a tapered portion 16 of the aperture 14 and positively fixes the position of the swivel fitting body 410 as may be desired or required. Rotation of the adjustment screw 440 serves to control pilot flow through the swivel fitting 400 at the first end 424 of the swivel fitting stem 420.

It should also be appreciated that, between the different alternative embodiments discussed in this detailed description, other embodiments can be devised using the combined teachings of the present invention. For example, it is to be noted that the threads in the threaded aperture 115 of the first embodiment, as shown in FIG. 4, are to be contrasted with the threads in the threaded aperture 315, as shown in FIG. 11, of the third embodiment, although either could be used in both of those embodiments, depending on the required application. Those skilled in the art will also recognize that the swivel bodies 110, 310 could be swapped out as desired or required by the intended specific application. The same can be said of the swivel bodies 110, 210 that can be used to alternatively control pilot flow or serve as a pressure tap for the system in which the component 100, 200 is used, respectively. Indeed, there are at least fourteen different embodiments that could be derived using the various separate fundamental components that are common to each of the three embodiments of positive swivel fitting 100, 200, 300 that are disclosed herein. Those fundamental components comprise the swivel fitting body, the swivel fitting nut and the swivel fitting stem. Further, each of those embodiments is intended by these inventors to be fully covered by the scope of the present invention.

The details of the invention having been disclosed in accordance with the foregoing, we claim:

1. A positive swivel fitting for use with a generic flow system device, such device used within an air, other gas or liquid flow system, the positive swivel fitting comprising:

a system flow transmitting portion comprising a swivel fitting body, the body comprising a first end, a second end, a bottom surface, a first threaded aperture disposed at the second end of and axially aligned with the body and a second aperture extending upwardly and inwardly from the bottom surface of the swivel fitting body, and a swivel fitting stem, the stem comprising a cylindrical middle portion, a circumferential middle portion groove, a first end and a second end, the second end comprising a tapered shoulder portion, the tapered shoulder portion being defined circumferentially about the second end, and an axially-aligned aperture extending through the center of the stem and creating a flow continuum through the stem; and a separate lock-down portion comprising a swivel fitting nut, the nut comprising a hexagonally-shaped first end, a threaded second end and an internal cylindrical aperture, a diameter of the internal cylindrical aperture being slightly greater than an outer diameter of the cylindrical middle portion of the stem wherein the nut is rotatable around the middle portion of the stem and crimped around the tapered shoulder portion of the swivel fitting stem, and wherein the generic flow system device comprises a threaded aperture and the threaded second end of the nut is configured as a tapered NPT thread with openings defined in the threaded second end and is threadably receivable within the threaded aperture of the generic flow system device such that the second nut end can be crimped about the second end of the stem when the fitting is tightened into the threaded aperture of the generic flow system device; and a seal, the seal being O-shaped and captured within the groove of the stem;

wherein the flow transmitting portion is configured to be receivable within the lock-down portion such that, when the flow transmitting portion is positively positioned relative to the generic flow system device, the lock-down portion can be secured and the position of the flow transmitting portion is maintained.

2. The positive swivel fitting of claim 1 wherein the first end of the swivel fitting stem is fixably inserted into the second aperture of the swivel fitting body with the swivel fitting nut disposed around the swivel fitting stem.

3. The positive swivel fitting of claim 2 wherein a flow continuum is formed through the axially-aligned aperture of the swivel fitting stem and the second aperture of the swivel fitting body.

4. The positive swivel fitting of claim 3 wherein the swivel fitting stem and the swivel fitting body are rotatable 360° relative to the generic flow system device.

\* \* \* \* \*